US008640956B2

(12) United States Patent
Gomez et al.

(10) Patent No.: US 8,640,956 B2
(45) Date of Patent: Feb. 4, 2014

(54) ACCESSING CONTENT VIA A MATRIX CODE

(75) Inventors: Mark H. Gomez, Parker, CO (US); John T. Kennedy, Denver, CO (US); Gregg Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 71 days.

(21) Appl. No.: 12/971,349

(22) Filed: Dec. 17, 2010

(65) Prior Publication Data

US 2012/0153015 A1    Jun. 21, 2012

(51) Int. Cl.
*G06K 7/00*    (2006.01)

(52) U.S. Cl.
USPC ..................... 235/462.01; 235/375

(58) Field of Classification Search
None
See application file for complete search history.

(56) References Cited

U.S. PATENT DOCUMENTS

| | | |
|---|---|---|
| 4,809,325 A | 2/1989 | Hayashi et al. |
| 4,837,414 A | 6/1989 | Edamula |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,959,285 A | 9/1999 | Schuessler |
| 5,978,855 A | 11/1999 | Metz et al. |
| 6,006,990 A | 12/1999 | Ye et al. |
| 6,058,238 A | 5/2000 | Ng |
| 6,512,919 B2 | 1/2003 | Ogasawara |
| 6,556,273 B1 | 4/2003 | Wheeler et al. |
| 6,983,304 B2 | 1/2006 | Sato |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

U.S. Appl. No. 12/953,227, filed Nov. 23, 2010, Michael T. Dugan et al., Pending.

(Continued)

*Primary Examiner* — Michael G Lee
*Assistant Examiner* — Matthew Mikels
(74) *Attorney, Agent, or Firm* — Kilpatrick Townsend & Stockton LLP

(57) ABSTRACT

A system for accessing content corresponding to a matrix barcode, such as a video and/or audio content. The system may include a mobile computing device in communication with a content receiver. The mobile computing device may be configured to capture the matrix barcode, for example, via using an optical component and/or barcode scanner to record and/or scan the matrix barcode. The mobile computing device may also include a network interface component configured to transmit the matrix barcode to the content receiver. The content receiver may then receive the matrix barcode from the mobile computing device. The content receiver may include a processor to determine and/or access the content corresponding to the matrix barcode. The content receiver may then transmit the content to a display device.

17 Claims, 7 Drawing Sheets

(56) References Cited

U.S. PATENT DOCUMENTS

| | | |
|---|---|---|
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0059339 A1 | 3/2005 | Honda et al. |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1* | 3/2007 | Attia et al. ............... 235/462.46 |
| 2007/0073585 A1 | 3/2007 | Apple et al. |
| 2007/0143788 A1 | 6/2007 | Abernethy et al. |
| 2007/0206020 A1 | 9/2007 | Duffield et al. |
| 2007/0256118 A1* | 11/2007 | Nomura et al. ................ 726/3 |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1* | 8/2008 | Matsuo et al. ................ 705/21 |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Kindberg |
| 2009/0031071 A1 | 1/2009 | Chiu |
| 2009/0031373 A1 | 1/2009 | Hogyoku |
| 2009/0083808 A1 | 3/2009 | Morrison |
| 2009/0088213 A1 | 4/2009 | Rofougaran |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0149187 A1 | 6/2010 | Slavin et al. |
| 2010/0154035 A1 | 6/2010 | Damola et al. |
| 2010/0161437 A1* | 6/2010 | Pandey ........................... 705/26 |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0327060 A1 | 12/2010 | Moran et al. |
| 2011/0030068 A1 | 2/2011 | Imai |
| 2011/0039573 A1 | 2/2011 | Hardie |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0096499 A1 | 4/2012 | Dasher et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153017 A1 | 6/2012 | Bracalente et al. |

(56) References Cited

U.S. PATENT DOCUMENTS

| | | |
|---|---|---|
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2013/0068838 A1 | 3/2013 | Gomez et al. |

FOREIGN PATENT DOCUMENTS

| | | | |
|---|---|---|---|
| DE | 10 2007 038 810 A1 | 2/2009 | |
| EP | 1 021 035 A1 | 7/2000 | |
| EP | 1 383 071 A2 | 1/2004 | |
| EP | 1 724 695 A1 | 11/2006 | |
| EP | 1 757 222 A1 | 2/2007 | |
| EP | 1 768 400 A2 | 3/2007 | |
| EP | 2 079 051 A1 | 7/2009 | |
| EP | 2 131 289 A1 | 12/2009 | |
| EP | 2 439 936 A2 | 4/2012 | |
| FR | 2 565 748 A1 | 12/1985 | |
| GB | 2 044 446 A | 10/1980 | |
| GB | 2 165 129 A | 4/1986 | |
| GB | 2 311 451 A | 9/1997 | |
| GB | 2 325 765 A | 12/1998 | |
| GB | 2 471 567 A | 1/2011 | |
| JP | 2002-215768 A | 8/2002 | |
| JP | 2007-213548 A | 8/2007 | |
| JP | 2008 244556 A | 10/2008 | |
| KR | 2004 0087776 A | 10/2004 | |
| WO | 95/27275 A1 | 10/1995 | |
| WO | 97/41690 A1 | 11/1997 | |
| WO | 01/06593 A2 | 1/2001 | |
| WO | 01/18589 A1 | 3/2001 | |
| WO | 2005/109338 A1 | 11/2005 | |
| WO | 2007/009005 A1 | 1/2007 | |
| WO | 2009/057651 | 5/2009 | |
| WO | 2009/144536 A1 | 12/2009 | |
| WO | 2010/149161 A1 | 12/2010 | |
| WO | 2011/009055 A2 | 1/2011 | |
| WO | 01/58146 A2 | 8/2011 | |

OTHER PUBLICATIONS

U.S. Appl. No. 12/953,273, filed Nov. 23, 2010, Dan J. Minnick et al., Pending.

U.S. Appl. No. 12/958,073, filed Dec. 1, 2010, William Michael Beals et al., Pending.

U.S. Appl. No. 12/960,285, filed Dec. 3, 2010, Jason Gaede, et al., Pending.

U.S. Appl. No. 12/961,369, filed Dec. 6, 2010, Mark H. Gomez, Pending.

U.S. Appl. No. 12/964,478, filed Dec. 9, 2010, William Michael Beals, Pending.

U.S. Appl. No. 12/965,645, filed Dec. 10, 2010, Kranti Kilaru et al., Pending.

U.S. Appl. No. 12/973,431, filed Dec. 20, 2010, Keith Gerhards et al., Pending.

U.S. Appl. No. 12/981,244, filed Dec. 29, 2010, Steven M. Casagrande et al., Pending.

U.S. Appl. No. 12/984,385, filed Jan. 4, 2011, Max S. Gratton, Pending.

U.S. Appl. No. 12/986,271, filed Jan. 7, 2011, Mark H. Gomez et al., Pending.

U.S. Appl. No. 13/006,270, filed Jan. 13, 2011, William Michael Beals et al., Pending.

U.S. Appl. No. 13/007,317, filed Jan. 14, 2011, Max S. Gratton et al., Pending.

U.S. Appl. No. 13/010,557, filed Jan. 20, 2011, William Michael Beals et al., Pending.

U.S. Appl. No. 13/014,591, filed Jan. 26, 2011, John T. Kennedy, Pending.

U.S. Appl. No. 13/015,382, filed Jan. 27, 2011, William Michael Beals et al., Pending.

U.S. Appl. No. 13/016,483, filed Jan. 28, 2011, Mark H. Gomez et al., Pending.

U.S. Appl. No. 13/020,678, filed Feb. 3, 2011, Dan J. Minnick et al., Pending.

U.S. Appl. No. 13/028,030, filed Feb. 15, 2011, Steven M. Casagrande et al., Pending.

U.S. Appl. No. 13/035,525, filed Feb. 25, 2011, Germar Schaefer et al., Pending.

U.S. Appl. No. 13/037,302, filed Feb. 28, 2011, Germar Schaefer et al., Pending.

U.S. Appl. No. 13/031,115, filed Feb. 18, 2011, Jason Anguiano, Pending.

U.S. Appl. No. 13/034,474, filed Feb. 25, 2011, Max S. Gratton, Pending.

U.S. Appl. No. 13/034,482, filed Feb. 24, 2011, Germar Schaefer, Pending.

U.S. Appl. No. 13/037,312, filed Feb. 28, 2011, Max S. Gratton et al., Pending.

U.S. Appl. No. 13/037,316, filed Feb. 28, 2011, Henry Gregg Martch et al., Pending.

U.S. Appl. No. 13/037,333, filed Feb. 28, 2011, Jason Gaede et al., Pending.

"Android App Reviews & Showcase Just a Tapp Away," Android Tapp, 10 pp. Found online at http://www.androidtapp.com/download-the-weather-channel-android-app-from-your-tv/, Oct. 22, 2010.

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y., "Data Transmission Between PDA and PC Using WiFi for Pocket Barcode Application", Thesis, University Teknologi

(56) References Cited

OTHER PUBLICATIONS

Malaysia, May 2007, 126 pp. Found online at http://eprints.utm.my/6421/1/SeahYeowNgeeMFKE20007TTT.pdf, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.
Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/986,721, filed Jan. 7, 2011, Office Action mailed Mar. 16, 2012, 6 pages.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.
Extended European Search Report for EP 12152690.9 dated Jun. 19, 2012, 9 pages.
International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/953,227, filed Nov. 23, 2010, Office Action mailed Nov. 7, 2012, 31 pages.

(56) References Cited

OTHER PUBLICATIONS

U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 13/037,312, filed Feb. 28, 2011, Office Action mailed Aug. 15, 2012, 9 pages.
U.S. Appl. No. 12/964,478, filed Dec. 9, 2010, Non-Final Office Action mailed Mar. 26, 2013, 19 pages.
U.S. Appl. No. 12/961,369, filed Dec. 6, 2010, Non-Final Office Action mailed Mar. 25, 2013, 17 pages.
U.S. Appl. No. 12/953,227, filed Nov. 23, 2010, Final Office Action mailed May 24, 2013, 17 pages.
U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
Liu, Yue et al., "Recognition of QR code with mobile phones," Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 12/981,244, filed Dec. 29, 2010, Final Office Action mailed Oct. 30, 2013, 10 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011, Final Office Action mailed Oct. 16, 2013, 28 pages.
U.S. Appl. No. 13/037,316, filed Feb. 28, 2011, Final Office Action mailed Aug. 28, 2013, 13 pages.
U.S. Appl. No. 13/673,480, filed Nov. 9, 2012, Final Office Action mailed Sep. 9, 2013, 10 pages.

* cited by examiner

US 8,640,956 B2

ACCESSING CONTENT VIA A MATRIX CODE

FIELD

The present disclosure relates generally to content receivers, and more specifically to accessing content on a content receiver utilizing matrix barcodes.

BACKGROUND

People may view a particular content such as a television show, movie or the like at one location (e.g., movie theater) and wish to eventually view that same content or a related content at another location and/or at another time. For example, while at a movie theater a person may see a trailer for a movie coming out in the future and want to remember to see that movie when it is released. It may be hard for a person to remember the details of the content and/or when the content is available (e.g., when a movie is released onto digital video disc). Also, there may be instances where a person is in another location (for example an airport) and a particular content is being displayed on a television (or other display device) nearby. The person may want to record/view this content on their own display device and/or at another time/ location. However, as the person may be in a remote location, this may not be possible. Furthermore, a person may forget or not know the name/details of the particular content.

SUMMARY

An embodiment of the present disclosure includes a method for accessing and viewing content. The method may include capturing, via an optical component, a matrix barcode that corresponds to the content. After the matrix barcode has been captured, the matrix barcode may be transmitted from the mobile device to a content receiver. The content receiver may then access the content corresponding to the matrix barcode. Once the content receiver has accessed the content, the content receiver may then transmit the content to a display device and/or the mobile computing device.

Still other embodiments of the disclosure may include a method of viewing content. The method may include capturing a matrix barcode corresponding to the content via an optical component in a mobile computing device. Once the matrix barcode is captured, the mobile computing device may then transmit the matrix barcode to a content receiver. After receiving the matrix barcode, the content receiver may request the content corresponding to the matrix barcode. After the content receiver requests the content, it may then access the content, e.g., from a broadcast center and/or content source. Once the content has been accessed, the content receiver may transmit the content a computing device. The computing device may be similar or the same as the mobile computing device and/or may be a display device.

Still other embodiments of the disclosure may include a system for accessing content (such as video/audio content) corresponding to a matrix barcode. The system may include a mobile computing device in communication with a content receiver. The mobile computing device may be configured to capture the matrix barcode, for example, via using an optical component and/or barcode scanner to record and/or scan the matrix barcode. The mobile computing device may also include a network interface component configured to transmit the matrix barcode to the content receiver. The content receiver may then receive the matrix barcode from the mobile computing device. The content receiver may include a processor to determine and/or access the content corresponding to the matrix barcode. The content receiver may then transmit, via a network/communication component, the content to a display device.

DETAILED DESCRIPTION

Figure 1:
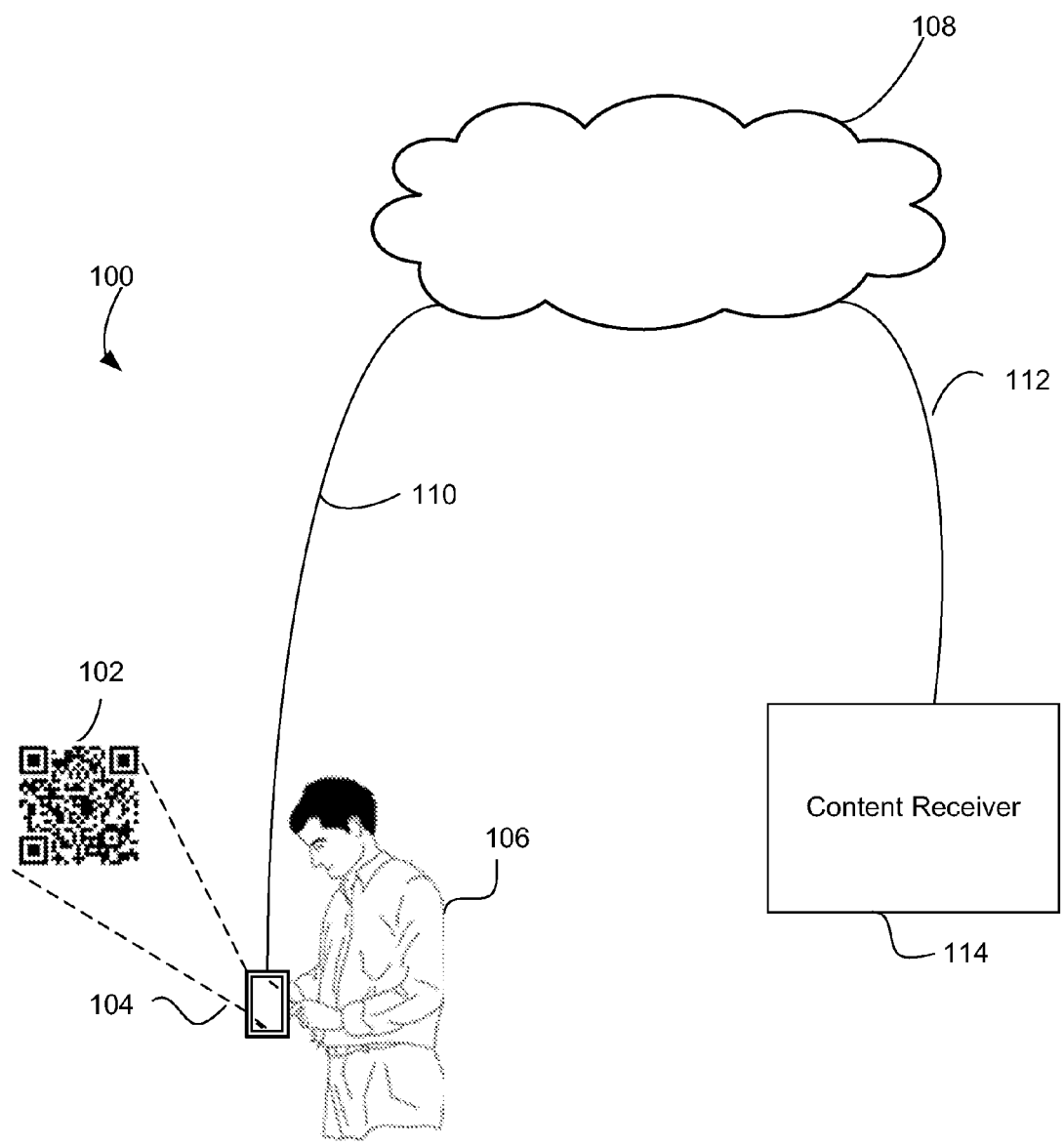
FIG. 1 is an embodiment of a user capturing a matrix barcode with a mobile computing device and communicating the matrix barcode to a content receiver.

Described herein are various examples of a system and/or method to record/display or otherwise access a particular content. A matrix barcode corresponding or relating to a specific content may be displayed on that specific content or other content. The matrix barcode may be displayed on almost any type of content; for example, the matrix barcode may be displayed on a video content (e.g., television show, movie, and the like), a print content (e.g., magazine, billboard, poster, and the like), an internet content (e.g., web page, electronic mail, and the like). The matrix barcode may be a graphical display that may include imbedded data relating to the specific content or another content. For example, the matrix barcode may include data such as the content's title, release date/time, price, and the like.

A person may record/capture the matrix barcode (such as QR code) via a mobile computing device (e.g., smart phone, digital camera, laptop computer). In these embodiments, the user may snap a photograph (using the mobile computing device) of a particular screen shot (for video content) or image (for print content) including the matrix barcode. The user may then transmit the matrix barcode and/or the data included in the matrix barcode to a content receiver. The matrix barcode and/or data may be transmitted via the mobile computing device or other computing device. However, in one embodiment the mobile computing device may communicate via a network to the content receiver.

Once the content receiver receives the matrix barcode and/ or the data corresponding to the matrix barcode, the content receiver may then access the content and/or determine whether the content is available. For example, in some instances the content may not be available at that select time. However, if the content is available, the content receiver may record and/or display the content or may set a reminder to view/access/record the content. The content receiver may also be in communication with a display device and may transmit the content to the display device.

In other embodiments, the content may be transmitted to the mobile computing device. The content may then be displayed immediately or at another time via the mobile computing device. Additionally or alternatively, the content receiver may also communicate with the mobile computing device regarding the status of the content (e.g., whether to record/display, transmit the content, availability of the content, and so on). These embodiments may allow a user to either record, display and/or set a reminder to record/display content without requiring the user to remember the content's details, such as the name, time it is available, length, and the like. This may be helpful as often people may forget when/where a particular content may be displayed. For instance, when a particular movie is available on digital video disc (DVD), when a particular television show is broadcast, and the like.

Additionally, embodiments disclosed herein may allow a user to quickly and/or remotely record a particular content. For example, if a user is in a remote location and views on a display device a particular show or sporting event that he wishes to view another time. The user may record/capture a matrix barcode associated with the particular content and then transmit the matrix barcode to the content receiver. The content receiver may then download/record the content. Further, the content receiver may additionally or alternatively transmit the content to the mobile computing device.

FIG. 1 is an embodiment of a mobile content accessing system 100. The mobile content accessing system 100 may include a user 106, a mobile computing device 104, a matrix barcode 102, a network 108, a content receiver 114 and communication paths 110, 112. The user 106 may capture the matrix barcode 102 via the mobile computing device 104 and then transmit the matrix barcode 102 to a content receiver 114 via the network 108 and communications paths 110, 112.

The user 106 may encounter a particular content displaying the matrix barcode 102. The user may use the mobile computing device 104 to capture the matrix barcode 102. For example, the mobile computing device 104 may include a digital camera, barcode scanner or some other optical component. The mobile computing device 104 then may transmit either data stored within the matrix barcode 102 and/or the matrix barcode 102 to the network 108 via the first communication path 110. The content receiver 114 may then communicate with the network 108 via the second communication path 112 and receive the matrix barcode 102 and/or data.

The matrix barcode 102 may be a two-dimensional barcode (such as a QR code) with data included in both the horizontal and vertical directions. The matrix barcode 102 may include practically any type of data and/or other information. For example, the matrix barcode 102 may include numeric, alphanumeric, binary, symbols and the like. In one embodiment, the data in the matrix barcode 102 may include details corresponding or relating to a specific content. For example, the details may include the name of the content, the time/date the content is accessible/available, the length of the content, the price of the content, actors/products in the content, and so on.

The network 108 provides the communication paths 110, 112 between the mobile computing device 104 and the content receiver 114 and may be wireless (e.g., satellite, microwave and other radio frequencies) or wired (e.g., fiber optic wire, coaxial cable). In some embodiments, the network 108 may further include satellites, receivers and/or transmitters to further transmit and receive content to and from mobile computing device 104 and/or the content receiver 114. Similarly, the communication paths 110, 112 may be wireless or wired, or any other type of electronic communication mechanism.

For example, in one embodiment, the communication paths 110, 112 are wireless and receive/transmit radio signals to and from radio towers and/or satellites. In other embodiments, the network 108 (including the communication paths 110, 112) may include a combination of wired and wireless communications. For example, one or both of the communication paths 110, 112 may be a direct wired connection between the mobile computing device 104 and the content receiver 114.

Figure 2:
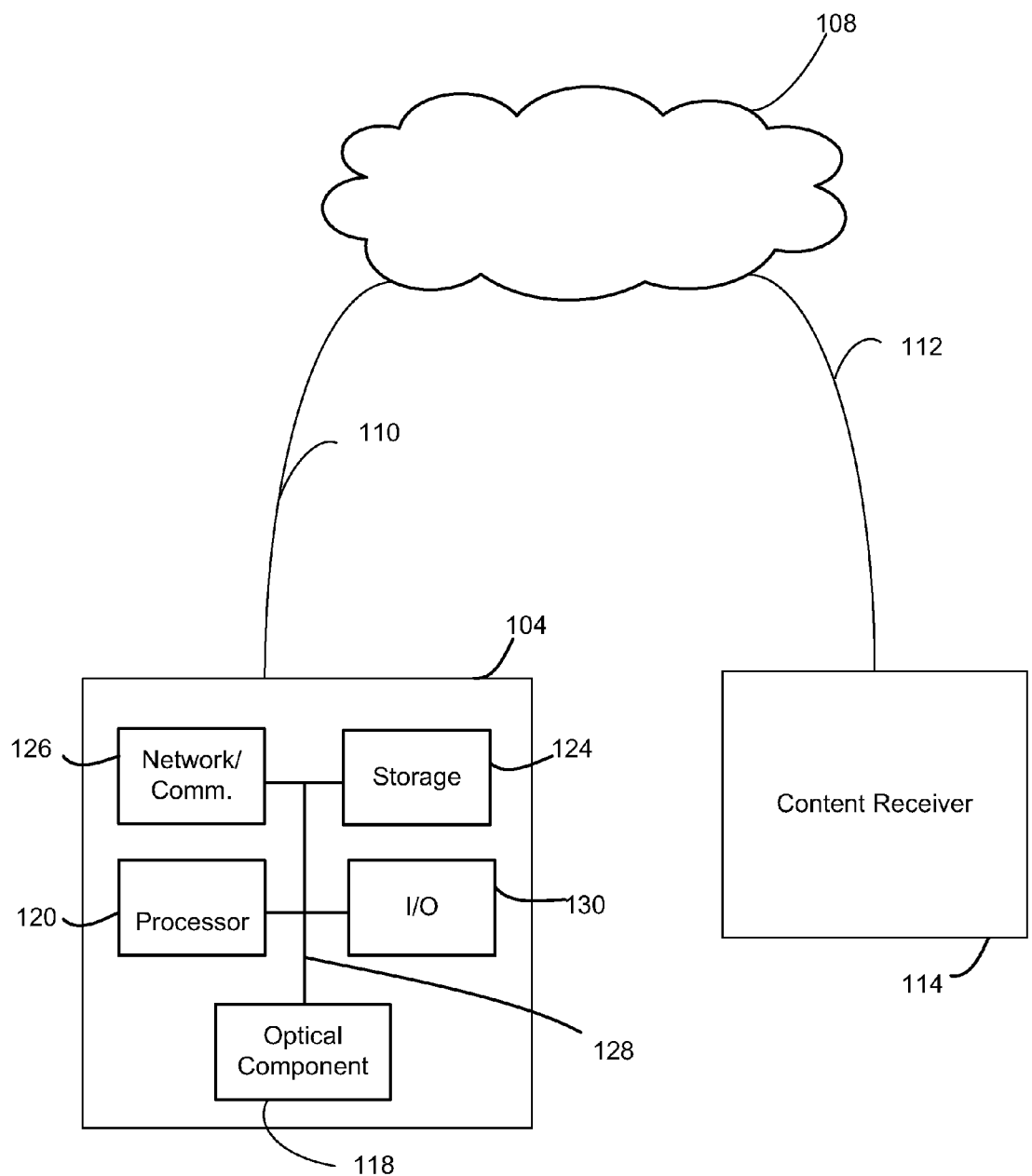
FIG. 2 is a block diagram of the first computing device communicating with the content receiver.

FIG. 2 is a block diagram of the mobile computing device 104 in communication with the content receiver 114 via the network 108. The mobile computing device 104 may be virtually any type of computing device. In some embodiments, the mobile computing device 104 may be a smart phone, personal digital assistant, a digital camera, and the like. The mobile computing device 104 may be used to capture an image/data of the matrix barcode 102 and/or transmit the data and/or the matrix barcode 102 to the content receiver 114. The mobile computing device 104 may include an optical component 118, a processing unit 120, storage 124, a network/communication interface 126, and an input/output component 130. Further, some or all of the components of the mobile computing device 104 may be in electronic communication with all or some of the other components via a system bus 128. The system bus 128 may provide a communication path to and from different components.

The optical component 118 may be used to capture and/or scan the matrix barcode 102. The optical component 118 may be virtually any type of device that may be used to optically read and/or capture images and/or data. In some embodiments, the optical component 118 may be a lens, barcode scanner, camera, and the like.

The network/communication interface 126 may transmit data and/or the matrix barcode 102 to the content receiver 114 (via the communication paths 110, 112 and/or network 108). As the network 108 may include a variety of electronic communication mediums, the network/communication interface 126 may send and receive almost any type of electronic communication.

The storage 124 may store electronic data that may be utilized by the mobile computing device 104. For example, the storage 124 may store the matrix barcode 102, data from the matrix barcode 102, as well as any other desired data. The storage 124 may be any type of memory that can store electronic data. For example, the storage 124 may be one or more non-transitory storage media (which may take the form of, but is not limited to, a magnetic storage medium; optical storage medium; magneto-optical storage medium; read only memory; random access memory; erasable programmable memory; flash memory; and so on).

The processor 120 may control operation of the mobile computing device 102. The processor 120 may be any electronic device cable of processing, receiving and/or transmitting instructions. For example, the processor 120 may be a microprocessor, a microcomputer and the like.

The input/output component 130 provides a communication mechanism between the user 106 and/or the processor 120. For example, the input/output component 130 may receive data entered by a user via a capacitive touch screen, keyboard, trackball, mouse, button or the like. Additionally, there may be multiple input/output components 130, allowing the mobile computing device 104 to receive information/data from any number of components or via any number of inputs by the user 106. Further, in some embodiments, the mobile computing device 104 may also include a screen or other display mechanism. For example, the display may be a liquid crystal display, plasma display and the like.

Figure 3:
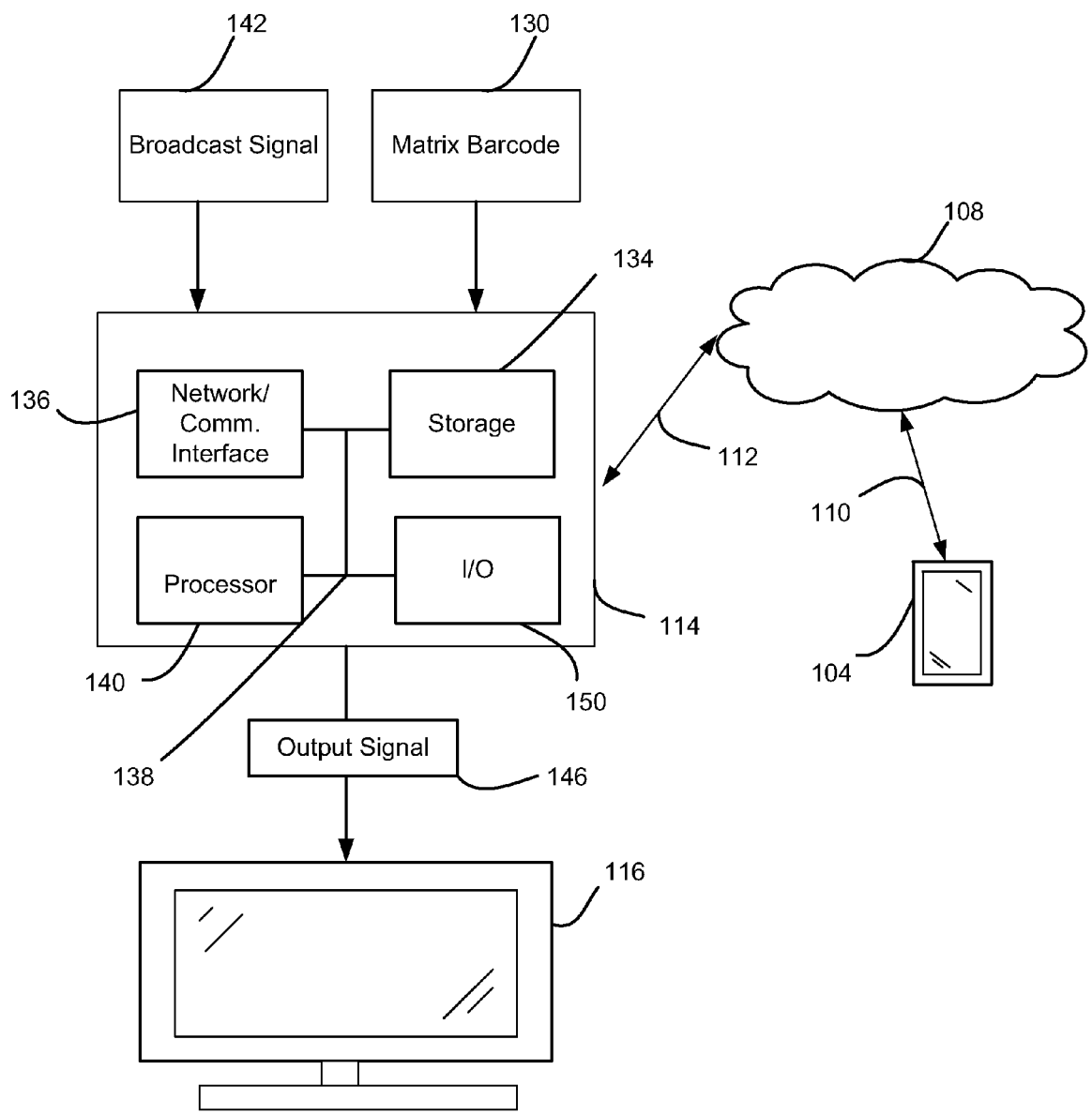
FIG. 3 is a block diagram illustrating a matrix barcode being communicated between the content receiver, a display device and/or the first computing device.

FIG. 3 is a block diagram of the content receiver 114 receiving the matrix barcode 102 and illustrating the content receiver 114 in communication with the display device 116 and the mobile computing device 104. The matrix barcode 102 (in the form of an electronic signal 130) may be transmitted to the content receiver 114 from the mobile communication device 104 (via the network 108). The content receiver 114 may then receive the electronic signal 130. The content receiver 114 may then transmit content related to the matrix barcode 102 to the display device 116, the mobile computing device 114 and/or one or more additional/alternative computing devices (not shown).

The content receiver 114 receives data from the mobile computing device 104 as well as content from a broadcast center (not shown) or other content provider via the network 108. The content receiver 114 outputs the content to the display device 116. Additionally, the content receiver 114 may communicate to and from the broadcast center to retrieve a specific content. For example, if the matrix barcode 102 provides the title of a particular television show, the content receiver 114 may retrieve information from the broadcast center regarding the time, length, and the like of the particular television show. Also, the content receiver 114 may receive the actual content (i.e., video and audio signals) corresponding/related to the matrix barcode 102. Similarly, the content receiver 114 may transmit information, content and/or data to the mobile computing device 104. Furthermore, the content receiver 114 may also record or otherwise store particular content.

The content receiver 114 may be practically any type of computing device able to receive, transmit and/or process audio, visual and/or data signals. For example, the content receiver 114 may be a set top box, a television receiver, a digital video recorder, a computer, and the like. The content receiver 114 may receive practically any form/type of content from almost any number of sources, this may include the electronic signal 130 from the mobile computing device 104, as well as television programming, recorded audio/video, electronic programming guide data, subtitles, and so on.

In some embodiments, the content receiver 114 may include a network/communication interface 136, storage 134, a processor 140 and an input/output interface 150 all tied together (or select components) via a system bus 130. Additionally, the content receiver 114 may also include an optical drive (e.g., digital video disk player, compact disk player, high definition digital video disc player, or the like), a universal serial bus drive and/or the like.

The network/communication interface 136 may be substantially similar to the network communication/interface 126 in the mobile computing device 104. However, in addition to data, the network/communication interface 136 may also receive a broadcast signal 142 from a content source center (not shown) via the communication paths 110, 112, network 108 and/or other communication mechanisms. This is because addition to receiving the electronic data signal 130, the network/communication interface 136 may also receive an over-the-air broadcast signal, a direct broadcast satellite signal, a cable television signal, an internet protocol television signal, and/or any other type of electronic communication signals.

The storage 134 may be similar to the storage 124 in the mobile computing device 104. The storage 134 may store electronic data that may be utilized by the content receiver 114. For example, the storage 134 may store content (e.g., video/audio signals, and the like), an electronic programming guide, user preference data (e.g., language, time zone and the like), settings data and the like.

The processor 140 may control operation of the content receiver 114. The processor 140 may be similar to the processor 120 in the mobile computing device 104. For example, the processor 140 may be any type of electronic device capable of processing, receiving and/or transmitting instructions (e.g., a microprocessor, a microcomputer and the like).

The input/output interface 150 provides communication to and from the content receiver 114 to and from a variety of devices/sources. For example, the input/output interface 150 may receive data from the mobile computing device 104, a remote control, control buttons located on the content receiver 114, other computing devices, and the like. Additionally, the input/output interface 150 may also receive/transmit data to and from an optical disc drive (e.g., digital video disc drive), universal serial bus drive, other video/audio/data signals (e.g., signals from a video game console), and the like. The input/output interface 150 may also provide an output signal 146 to the display device 116. The output signal 116 may be substantially similar to the broadcast signal 142 but may include additional information, such subtitles, user specific data, and the like.

The display device 116 may be in electronic communication with the content receiver 114. The display device 116 may be configured to display/output the content and/or data. For example, the display device 116 may display audio, video and data signals on a television display and/or computer monitor. The display device 116 may be any kind of electronic display such as a cathode ray tube display, a liquid crystal display, a plasma display and the like. Further, the display device 116 may also include an audio output mechanism in addition to or instead of a video display screen. For example, the display device 116 may include speakers (either external or internal) to a liquid crystal display screen (or any other suitable display).

The broadcast signal 142 may include content from a broadcasting center or content provider. The broadcast signal 142 may include audio, visual, and other data associated with a video broadcast stream. Similarly, the output signal 146 may be substantially the same or a slightly modified version of the broadcast signal 146. For example, the output signal 146 may be a select group of signals within the broadcast signal 142, i.e., signals corresponding to a particular channel. However, in other embodiments, the output signal 146 may be a signal other than the broadcast signal 142 (e.g., a digital video disc signal, signal from the network 108, and the like).

Figure 4:
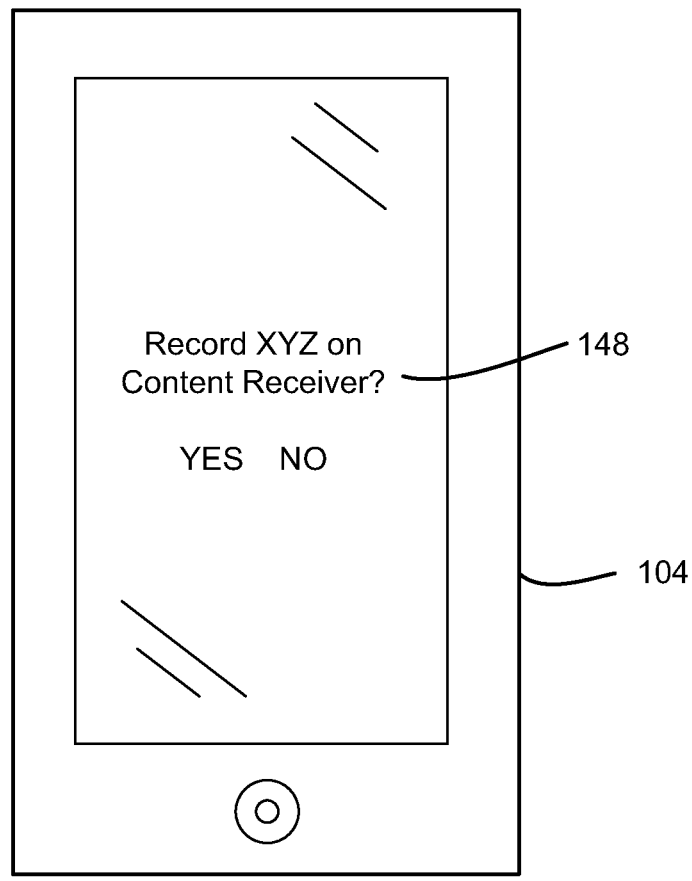
FIG. 4 is a screenshot illustrating an exemplary communication between the content receiver and the mobile computing device.

FIG. 4 is a screenshot illustrating an example of communication between the content receiver 114 and the mobile computing device 104. Referring to FIGS. 1-4, the mobile computing device 104 may transmit the electronic signal 130 to the content receiver 114. The content receiver 114 may additionally transmit data, content and the like to the mobile computing device 104. For example, the mobile computing device 104 may transmit the matrix barcode 102 (or simply the data within the matrix barcode 102) to the content receiver 114. If the matrix barcode 102 provides information regarding a particular content, the content receiver 114 may then determine if the content is available. If the content is available (either instantaneously or at some point in the future), the content receiver 114 may transmit an option 148 to the mobile computing device 104. The option 148 may be displayed on a screen of the mobile computing device 104. The user 106 may transmit data in response to the option 148 back to the content receiver 114 via the network 108. The option 148 may allow the user 106 to remotely operate, select or otherwise control the content receiver 114. For example, the option 148 may display on the mobile computing device 104 whether the user wants to record, display, purchase, transmit, access and/or the like a particular content or portion of content.

The option 148 and communication between the mobile computing device 104 and the content receiver 114 allows a user 106 to access, record, transmit, purchase and so on, content on the go. This may be helpful because the matrix barcode 102 may be displayed on almost any type of content and/or media. Additionally, this may allow a user 106 to forget information corresponding to a particular content and still access it in the future. Further, it may allow the user 106 the ability to remotely record/display content on the content receiver 114.

Figure 5A:
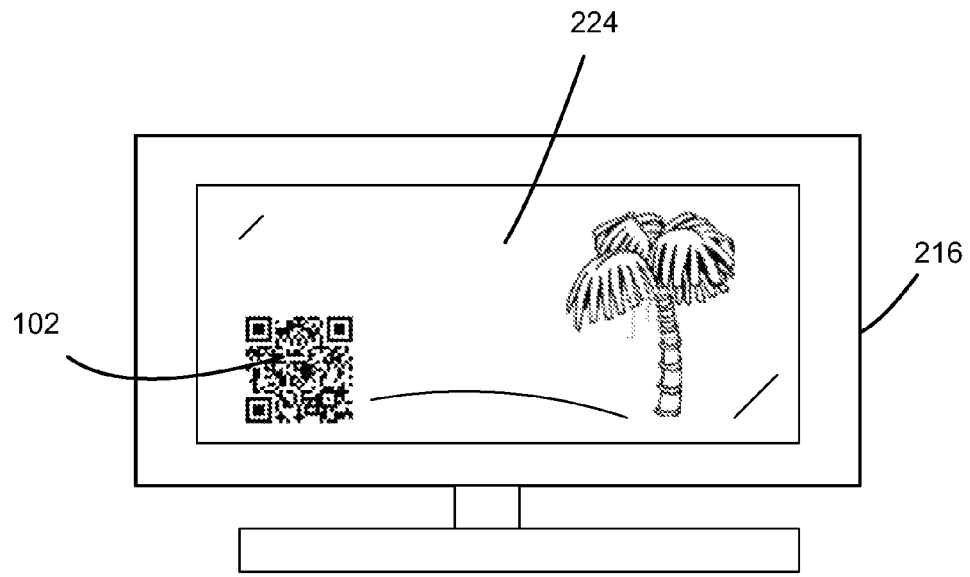
FIG. 5A illustrates a sample display device displaying video content including the matrix barcode.
Figure 5B:
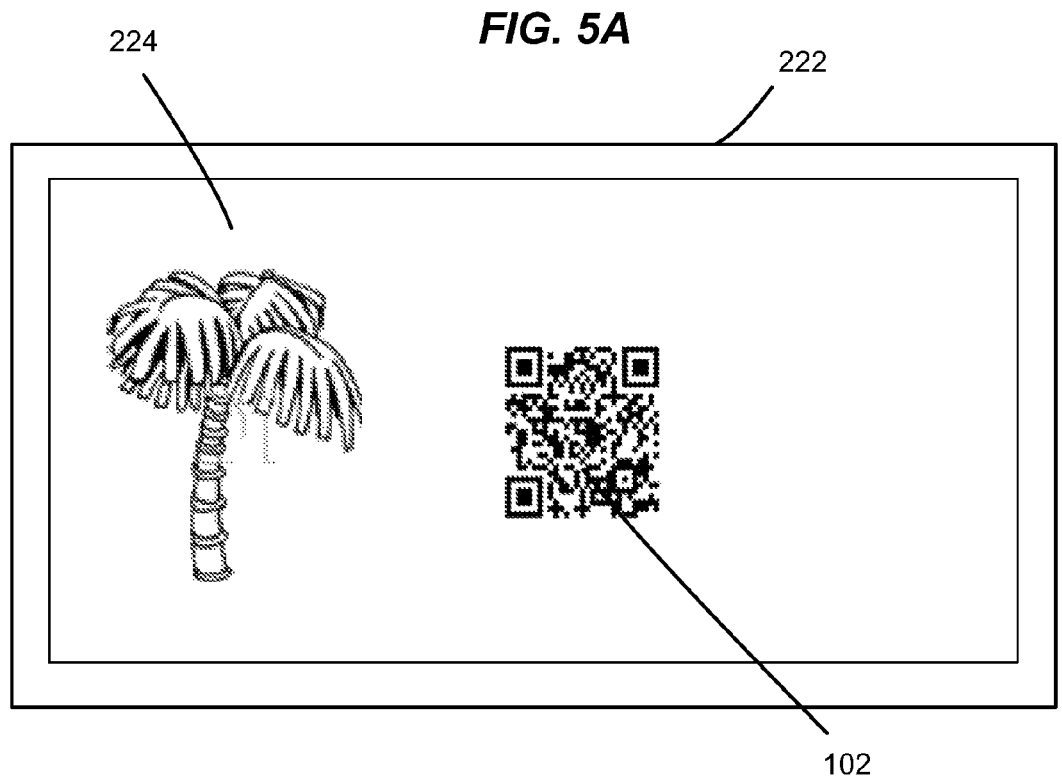
FIG. 5B illustrates a sample theater display device displaying the video content including the matrix barcode.

The matrix barcode 102 corresponding to selected content may be displayed on any number of media, locations, and the like. FIG. 5A is a sample display device 216 displaying video content 224 including the matrix barcode 102 and FIG. 5B is a sample theater display device 222 displaying the video content 224 and the matrix barcode 102. In one embodiment, the matrix barcode 102 may be displayed on the display device 216. The display device 216 may be any type of electronic display device 216 (e.g., plasma display, liquid crystal display, projection screen, and so on) and the content 224 may be a video content (e.g., television video stream). In other embodiments, the matrix barcode 102 may be displayed on a theater display device 222. The theater display device 222 may be substantially similar to the display device 216, however it may be a larger device, e.g., movie theater. In either embodiment, the matrix barcode 102 may appear with the content 224. For example, the matrix barcode 102 may be overlaid on top of the content 224 and/or illustrated as a part of the content 224. The content 224 may be a television show, movie, commercial and/or any other type of content 224 including a video/image display.

Figure 5C:
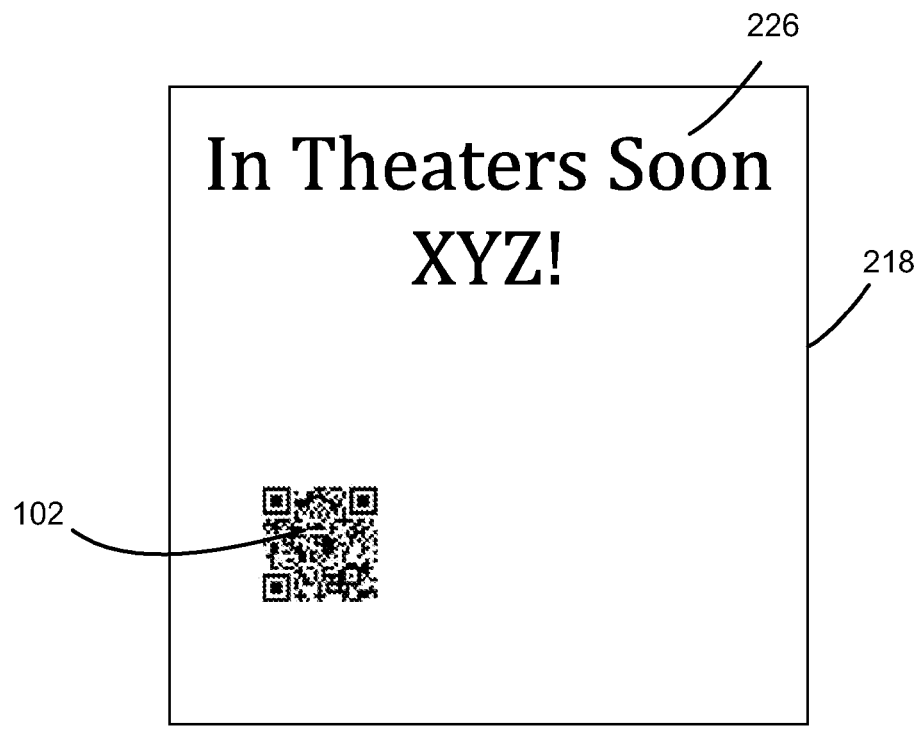
FIG. 5C illustrates a sample poster displaying print content including the matrix barcode.
Figure 5D:
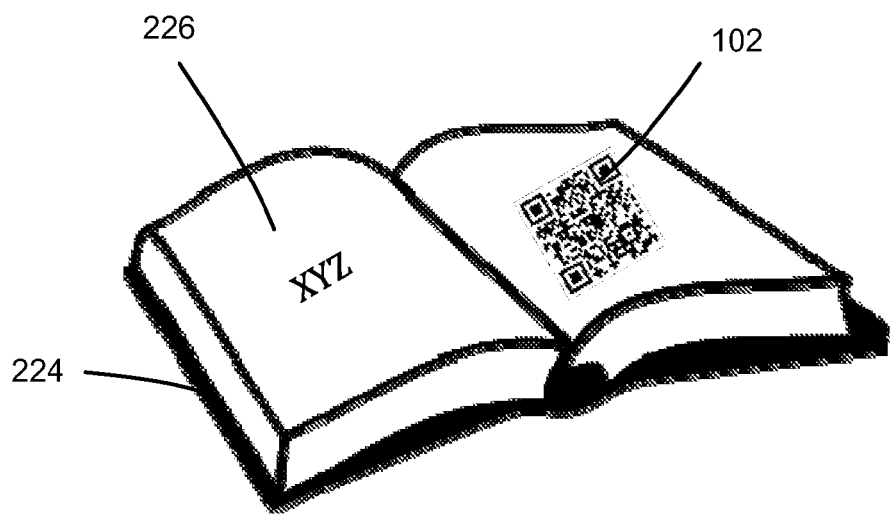
FIG. 5D illustrates a sample print material displaying the print content including the matrix barcode.

FIG. 5C is a sample poster 218 displaying print content 226 and the matrix barcode 102 and FIG. 5D is a sample print material 220 displaying the print content 226 and the matrix barcode 102. The poster 218 may be a billboard, sign, and so on. The print material 220 may be a substantially any type of print communication device, e.g., newspaper, book, magazine, electronic book reader, and the like. The print content 226 may be an image and/or text. For example, the print content 266 may be an advertisement for a broadcast content (e.g., television content, movie content, and the like). The matrix barcode 102 may then be displayed as part or separate from the print content 226 (which may include images and/or text). It should be noted that there are numerous other locations, media, and/or communication mechanisms that may be used to display and/or transmit the matrix barcode 102 and that FIGS. 5A-5D are simply exemplary embodiments.

Figure 6:
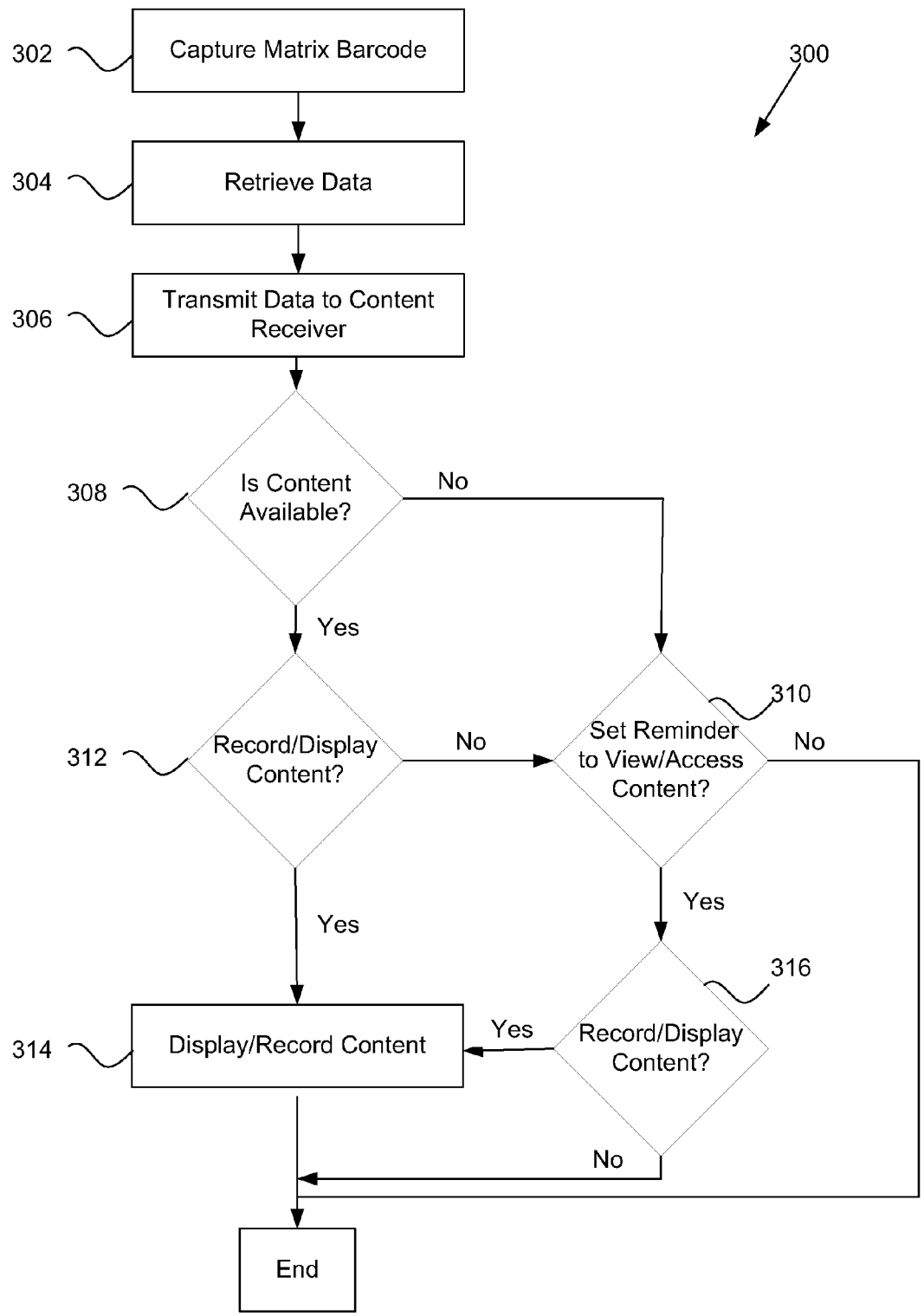
FIG. 6 is a flow chart illustrating a method for receiving and recording/displaying content.

FIG. 6 is an embodiment of a method 300 for accessing content via the matrix barcode 102. The method 300 begins at an operation 302 where the matrix barcode 102 is captured. This operation 302 may be performed by the optical component 118 on the mobile computing device 104. The optical component 118 may capture an image of the matrix barcode 102, scan the matrix barcode 102 or the like. After the matrix barcode 102 has been captured, the method 300 proceeds to operation 304. In this operation 304, data corresponding to the matrix barcode 102 is retrieved. The data may be details regarding a particular content, e.g., the content name/title, length, show time, availability, price, and/or any other type of information desired. Then the method 300 proceeds to operation 306, where the data is transmitted to the content receiver 114. This operation 306 may be performed via the network 108 and communication paths 110, 112. It should be noted that in some embodiments, the method 300 may proceed from operation 302 directly to operation 306. This is because the content receiver 114 in some embodiments may retrieve the data from the matrix barcode 102 instead of the mobile computing device 102.

In operation 308, once the data has been transmitted to the content receiver 114, the content receiver 114 determines if the content (corresponding to the data from the matrix barcode 102) is available. The matrix barcode 102 may be tied, related to or otherwise correspond to a selected content or set of contents. Operation 308 may be performed by analyzing the broadcast signal 142 and/or querying the broadcast center regarding the content.

In some instances the content may not be available. For example, if the content is a movie it may not be released to the public yet, if the content is a sports game it may not have been played/recorded, and the like. However, if the content is available, the method 300 proceeds to operation 312. In operation 312, the content receiver 114 may present the option 148 whether to record/display the content. The option 148 may be presented on the mobile computing device 104 (see e.g., FIG. 4), the display device 116, and so on. Additionally, the option 148 may be to either record the content, display the content, do neither and/or do both. If the user 106 selects to display and/or record the content, the method 300 proceeds to operation 314. In operation 314, the content receiver 114 displays and/or records the content. For example, the content receiver 114 may transmit the content to the display device 116 and/or may store the content in the storage 134.

In operation 312 if the user selects to not either record and/or display the content, then the method 300 proceeds to operation 310. In this operation 312, a second option is presented to the user 106. The second option may be whether a reminder should be set; the reminder may either be to record, display and/or access the content at a future time. The second option may be displayed on the display device 116, the mobile computing device 104 and/or other computing devices.

Operation 312 may also be accessed directly after option 308. For example, if the content receiver 114 determines that the content is not currently available, the user 106 may wish to set a reminder to have the content receiver 114 check the content availability in the future. If the user 106 selects the second option and sets a reminder for recording/accessing/displaying the content in the future, the method 300 then proceeds to operation 316. In operation 316, the first option 148 may be presented again, when the content is available. Thus, operation 316 may be substantially similar to operation 312, however it may occur only after the content has been unavailable at least once.

One skilled in the art will understand that the following description has broad application. For example, while embodiments disclosed herein may focus on a mobile computing device, it should be appreciated that the concepts disclosed herein equally any other computing device and/or optical device with a network interface. Also, for the sake of discussion, the embodiments disclosed herein may tend to focus on content receivers such as set top boxes; however, these concepts apply to computing devices that may analyze/process electronic signals. Accordingly, the discussion of any embodiment is meant only to be exemplary and is not intended to suggest that the scope of the disclosure, including the claims, is limited to these embodiments.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

What we claim is:

1. A method for accessing content on a content receiver comprising the steps of:
   receiving on the content receiver a matrix barcode;
   decoding information from the matrix barcode;
   determining if a content corresponding to the matrix barcode is available utilizing the information decoded from the matrix barcode;
   setting a reminder on the content receiver to check if the content is available at a later time based on the content not being available; and
   at the later time, accessing on the content receiver the content based on the content being available.

2. The method of accessing content of claim 1, further comprising the steps of:
   capturing the matrix barcode via an optical component on a mobile computing device; and
   transmitting the matrix barcode to the content receiver from the mobile computing device.

3. The method of accessing content of claim 1, further comprising displaying on a display device the content after the content has been accessed.

4. The method of accessing content of claim 1, further comprising recording the content on the content receiver after the content has been accessed.

5. The method of accessing content of claim 1, wherein the content receiver is a set top box.

6. The method of accessing content of claim 1, wherein the content is a video content.

7. The method of accessing content of claim 1, further comprising the step, if the content is available, transmitting from the content receiver an option to record or display the content on the content receiver to a mobile computing device.

8. The method of accessing content of claim 1, further comprising the step of, if the content is available, transmitting the content via the content receiver to a mobile computing device.

9. The method of accessing content of claim 8, further comprising the step of, displaying the content on a display screen of the mobile computing device.

10. A method of displaying content comprising the steps of:
    transmitting from a mobile computing device a matrix barcode to a content receiver, wherein the matrix barcode corresponds to a specific content;
    decoding information from the matrix barcode;
    determining via the content receiver, data corresponding to the specific content from the matrix barcode utilizing the information decoded from the matrix barcode;
    verifying whether the specific content is available;
    transmitting from the content receiver a first message to a computing device wherein the first message presents an option to set a reminder on the content receiver to access the specific content in the future based on the specific content not being available; and
    transmitting from the content receiver the specific content to a display device based on the selected content being available.

11. The method of displaying content of claim 10, wherein the mobile computing device is a smart phone.

12. The method of displaying content of claim 10, wherein the content receiver transmits the specific content to a display device on the mobile computing device.

13. A system for accessing content comprising:
    a mobile computing device comprising:
      an optical component configured to capture a matrix barcode;
      a processor in communication with the optical component; and
      a network interface component in communication with the processor; and
    a content receiver in communication with the mobile computing device, comprising
      a content receiver network interface component; and
      a content receiver processor in communication with the content receiver network interface component, wherein the content receiver
      receives via the content receiver network interface component, the matrix barcode from the mobile computing device;
      decodes information from the matrix barcode;
      accesses via a network, a content corresponding to the matrix barcode utilizing the information decoded from the matrix barcode; and
      transmits via the content receiver network interface the content
      wherein the content receiver is further configured to determine whether the content is available from a content source and if the content is not available, the content receiver is configured to set a reminder to determine if the content is available in the future.

14. The system of claim 13, further comprising a display device in communication with content receiver, wherein the display device is configured to receive the content from the content receiver.

15. The system of claim 13, wherein the mobile computing device is further configured to receive the content from content receiver.

16. The system of claim 13, wherein the content receiver is a set top box.

17. The system of claim 13, wherein the content is a video content.

* * * * *